US006019360A

United States Patent [19]

Rice

[11] Patent Number: 6,019,360

[45] Date of Patent: Feb. 1, 2000

[54] PLASTIC PIPE VISE

[76] Inventor: Michael R. Rice, 17228 E. 34-H Dr., Newalla, Okla. 74857

[21] Appl. No.: 09/248,376

[22] Filed: Feb. 10, 1999

[51] Int. Cl.[7] .................... B23Q 3/00

[52] U.S. Cl. .................... 269/296; 269/902; 269/55; 269/58; 269/909

[58] Field of Search .................... 269/296, 902, 269/909, 55, 58

[56] References Cited

U.S. PATENT DOCUMENTS

| | | | |
|---|---|---|---|
| 1,481,503 | 1/1924 | Carswell et al. | 269/55 |
| 2,880,772 | 4/1959 | Polchow | 269/902 |
| 3,815,888 | 6/1974 | Kentner | 269/2 |
| 4,579,322 | 4/1986 | Schwarz | 269/70 |
| 4,893,802 | 1/1990 | Lin | 269/74 |
| 4,924,843 | 5/1990 | Waren | 269/289 R |

*Primary Examiner*—Timothy V. Eley
*Assistant Examiner*—Benjamin M. Halpern
*Attorney, Agent, or Firm*—Robert K. Rhea

[57] ABSTRACT

A vise for securing plastic pipe while sawing a section of pipe to length is formed by a U-shaped base supported by a plurality of short legs. A V-shaped cradle is pivotally connected by its legs with the legs of the U-shaped member for successively receiving and holding a plurality of pipe of different diameters. The confronting surfaces of the V-shaped legs have a layer of material having a high coefficient of friction bonded thereto.

6 Claims, 2 Drawing Sheets

PLASTIC PIPE VISE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to plumbing tools and more particularly to a vise for plastic pipe.

1. Field of the Invention

When doing plumbing work in the field, it is frequently necessary to cut a piece of pipe to length from a longer section. This is usually accomplished as by a hack saw, or the like, while manually holding the plastic pipe which is not much of a problem when the pipe is of relatively small diameter but when larger sizes are involved it is difficult to hold an end portion of a joint of pipe to cut a piece of pipe to length without some means of steadying the joint of pipe.

This invention solves this problem by providing a relatively small tool which can be supported by any generally horizontal surface which nests an intermediate portion of the pipe adjacent the position it is to be severed.

2. Description of the Prior Art

The only patent known to be pertinent to this invention is U.S. Pat. No. 3,815,888 issued Jun 11, 1974 to Kentner for Vise For Plastic Pipe.

This patent discloses an elongated strap metal-like base member having an upwardly open V-shaped recesses of different sizes for different diameters of pipe and further includes an inverted V-shaped member having a handle having an articulated connection with the base to overly a pipe positioned in a selected one of the upwardly open V-shapes of the base. This tool works very well, however it does not solve the above described problem of holding an intermediate portion of a plastic pipe joint upon uneven surfaces. For example, when the end of the pipe opposite that being sawed is elevated or depressed from the position of the tool. This invention solves this problem by permitting the pipe holding member to be pivoted about a horizontal axis in either longitudinal direction of a pipe joint to securely hold the pipe by a single workman while sawing a pipe to length.

BRIEF SUMMARY OF THE INVENTION

An upwardly open U-shaped base is supported by three circumferentially spaced legs connected with its bight portion. A generally V-shaped cradle is pivotly supported by the upper end portion of the V-shape legs mounted on a horizontal axis extending between the upper end portion of the legs of the U-shaped base permitting to-and-fro swinging movement of the cradle transversely of the bight portion of the U-shaped base. The inner wall surfaces of the V-shape legs have a high coefficient of friction coating or a resilient pad bonded thereto for gripping opposite peripheral portions of a pipe when supported by the V-shaped cradle.

The principal object of this invention is to provide a vise for securely supporting an intermediate portion of a standard size length of plastic pipe in which the axis of the length of pipe supported may be parallel with or inclined with respect to the transverse plane of the U-shaped base bight portion and in which legs of the tool may be folded for transport or storage.

DETAILED DESCRIPTION OF THE INVENTION

Figure 1:
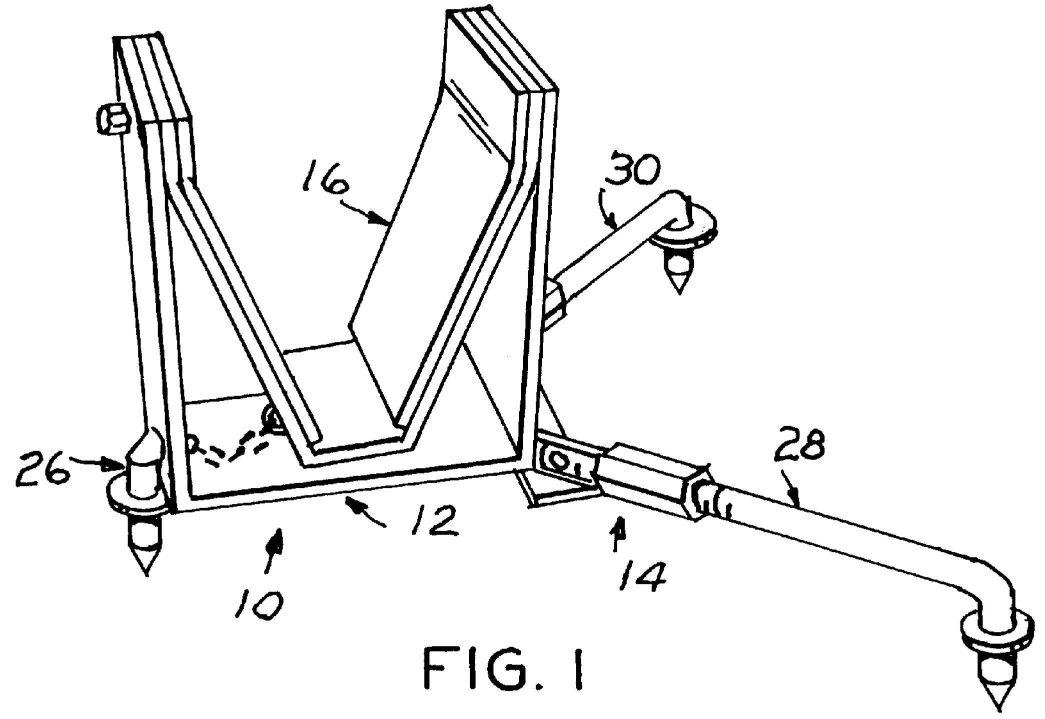
FIG. 1 is a perspective view of the tool in operative position.
Figure 2:
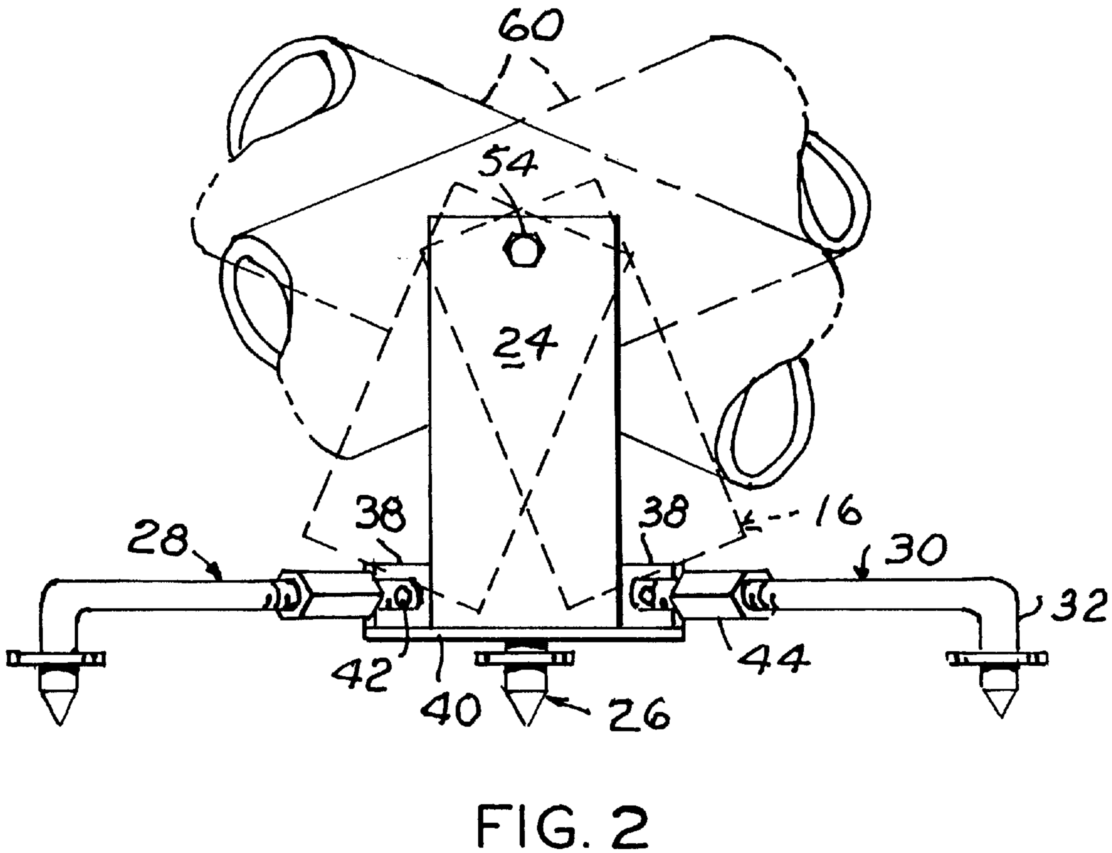
FIG. 2 is a side elevational view, illustrating by dotted and phantom lines, inclined positions of a fragmentary length of pipe supported by the cradle.
Figure 3:
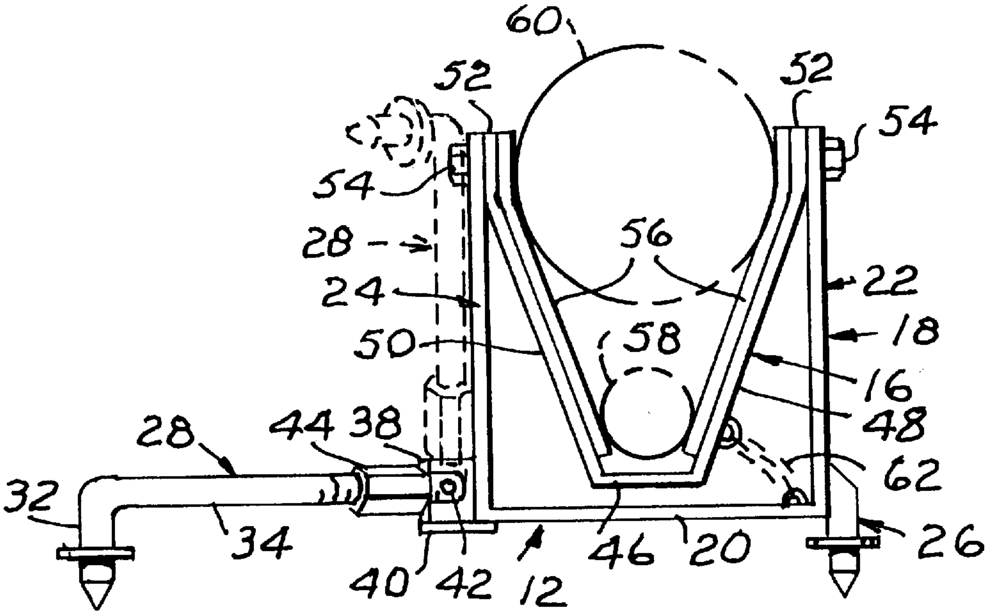
FIG. 3 is a right side elevational view of FIG. 2.
Figure 4:
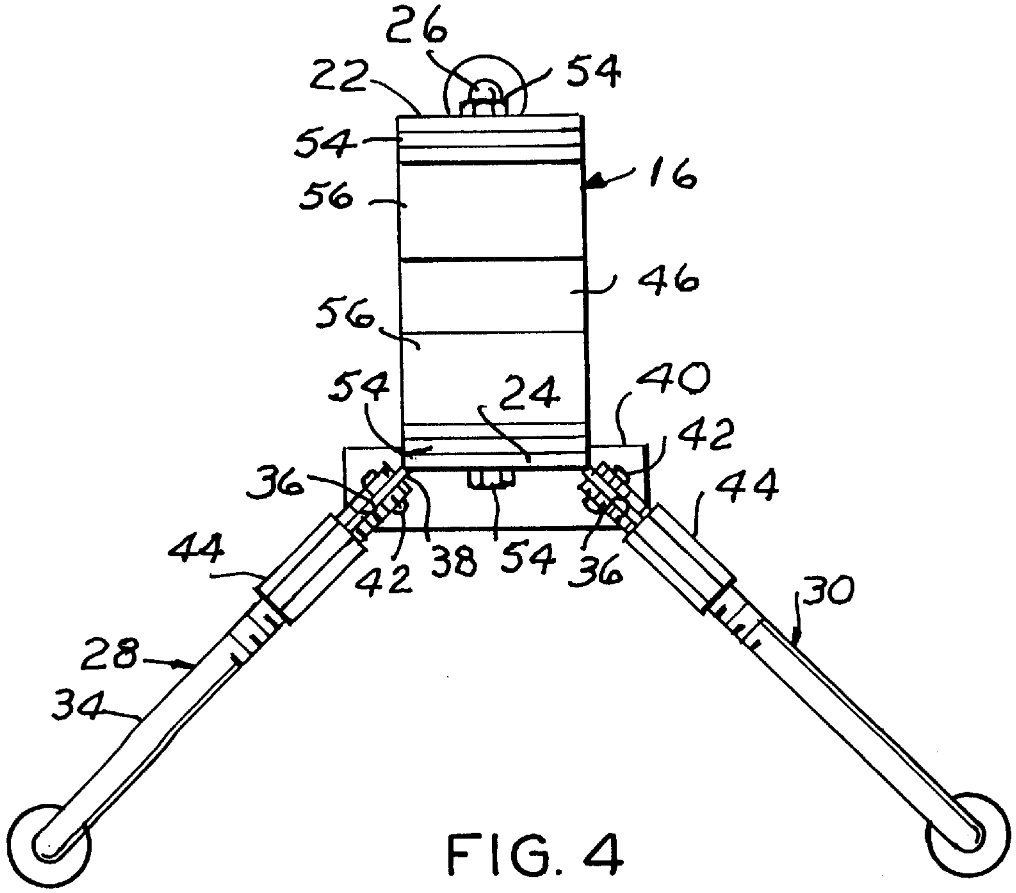
FIG. 4 is a top view of the tool, per se.

Like characters of reference designate like parts in those figures of the drawings in which they occur.

In the drawings:

The reference numeral 10 indicates the vise as a whole comprising a base means 12, leg support means 14 and a cradle means 16 supported by the base.

The base means 12 comprises a U-shaped member 18, formed from planar material, having a rectangular horizontal bight portion 20 and upstanding legs 22 and 24.

The leg means 14 comprises a plurality of legs, three in the example shown. A relatively short leg 26 is vertically attached to the depending portion of the U-shaped member leg 22 outer surface projects downwardly beyond the depending limit of the U-shaped bight portion 20. The other legs 28 and 30 are disposed in diverging outrigger fashion comprising vertical end portions 32, substantially equal in length with respect to the first leg 26 and each include a horizontal portion 34 having external threads at its end portion opposite the vertical portions 32 and bifurcated as at 36, for respectively pivotly straddling a pair of vertically disposed planar webs 38. The webs are mounted on a platform 40 projecting laterally from the lower limit of the U-shaped member leg 24 and diverge in angular relation from respective side edges of the depending end portion of the leg 24. The bifurcated end portions of the legs 28 and 30 are pivotly secured to the respective web by a pin 42 permitting vertical pivoting movement about the horizontal axis of the pins 42 from the horizontal to an upright position adjacent the U-shaped base leg 24. A lock nut 44 surrounds the threaded end portion of each leg 28 and 30 for abutting the adjacent vertical or top horizontal surface of the respective web and maintaining the legs 28 and 30 in horizontally disposed operative position or upwardly disposed stored positions when the apparatus 10 is not in use.

The cradle means 16 comprises a substantially V-shaped member having a bight portion 46 and angularly upward diverging legs 48 and 50 which terminate in parallel vertically disposed end portions 52 parallel with the upper end portion of the respective U-shaped member legs 22 and 24. The V-shape legs are pivotly connected with the U-shape legs by stud bolts 54 for vertical swinging movement of the cradle means 16, transversely of the base bight portion 20, about the horizontal axis defined by the stud bolts 54.

The confronting surfaces of the V-shape legs 48 and 50, including their vertical end portions 52, are bonded to a layer of resilient material 56 having a high coefficient of friction for gripping opposing peripheral surfaces of a series of plastic pipe 58 and 60 ranging in diameters from 3.81 cm (1.5 inches) to 10.16 cm (4 inches). The depending end portion of the cradle means 16 is preferably loosely tethered to the base means 12 by a flexible member such as a chain 62.

I claim:

1. A vise for cylindrical objects, comprising:

base means including a U-shaped member having a bight portion and upstanding legs;

leg means including a plurality of base legs for supporting said base means;

cradle means including upwardly diverging legs having inner wall surfaces and terminating upwardly in upstanding parallel relation and pivotally connected with said base means legs opposite the bight portion for vertical swinging movement of the cradle means about a horizontal axis; and, a layer of material having a high coefficient of friction bonded to the inner wall surfaces of the V-shape legs.

2. The vise according to claim 1 in which at least one leg of said plurality of legs projects outwardly from said base means bight portion in outrigger fashion.

3. The vise according to claim 2 in which said one leg of said plurality of legs is pivotally connected with said base means; and, adjustable means on said one leg of said plurality of legs for immobilizing said one leg of said plurality of legs.

4. A vise for cylindrical objects, comprising:

base means including upright spaced-apart members having upper end portions;

leg means for supporting said base means;

cradle means including upwardly diverging legs having inwardly facing and confronting surfaces and terminating upwardly in upstanding parallel relation and pivotally connected with the upper end portions of said base means members for vertical swinging movement of the cradle means about a horizontal axis; and, a layer of material having a high coefficient of friction bonded to the confronting surfaces of the cradle means legs.

5. The vise according to claim 4 in which said leg means includes:

a plurality of legs connected with said base means, at least one leg of said plurality of legs projecting outwardly from said base means in outrigger fashion.

6. The vise according to claim 5 in which said one leg of said plurality of legs is pivotally connected with said base means; and, adjustable means on said one leg of said plurality of legs for immobilizing said one leg of said plurality of legs.

* * * * *